UNITED STATES PATENT OFFICE.

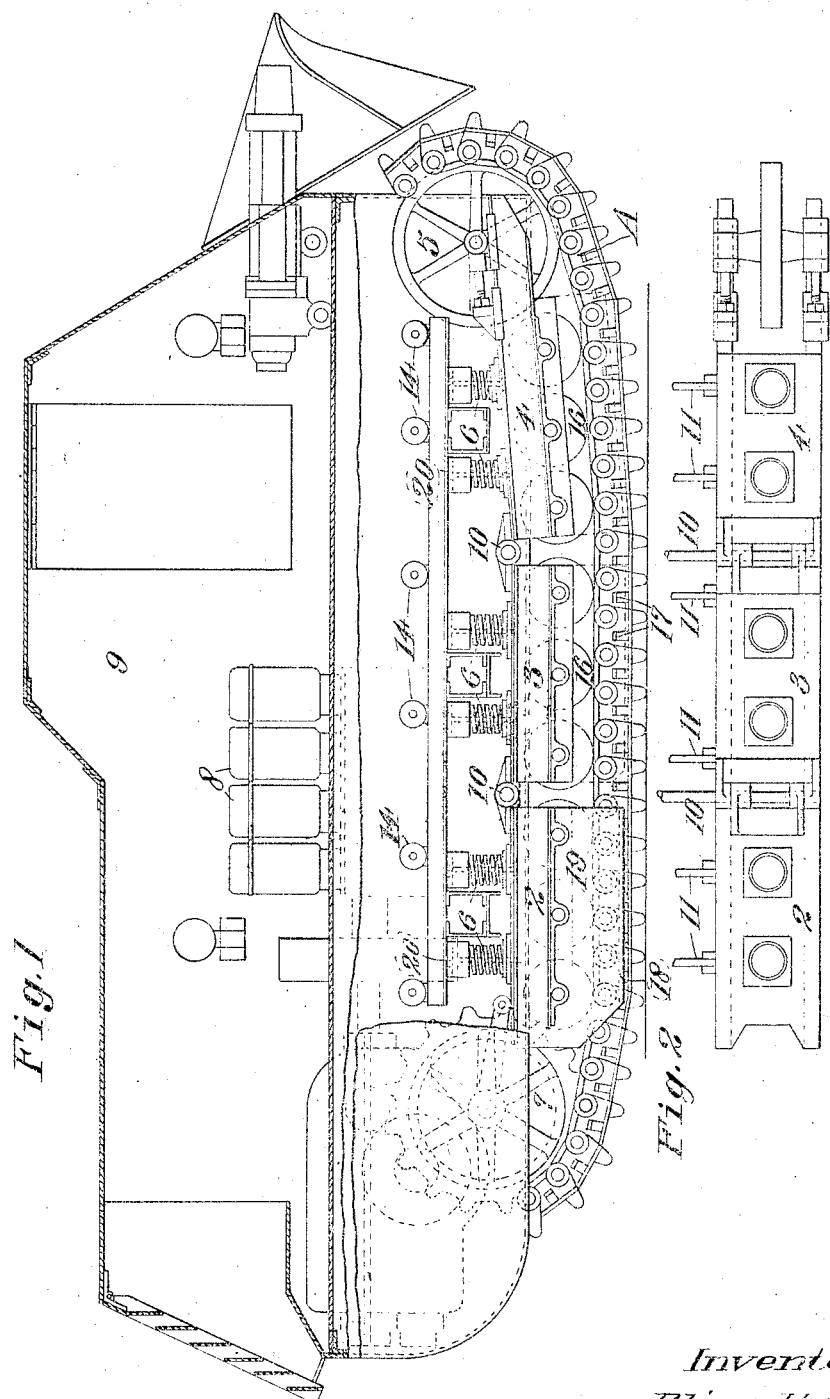

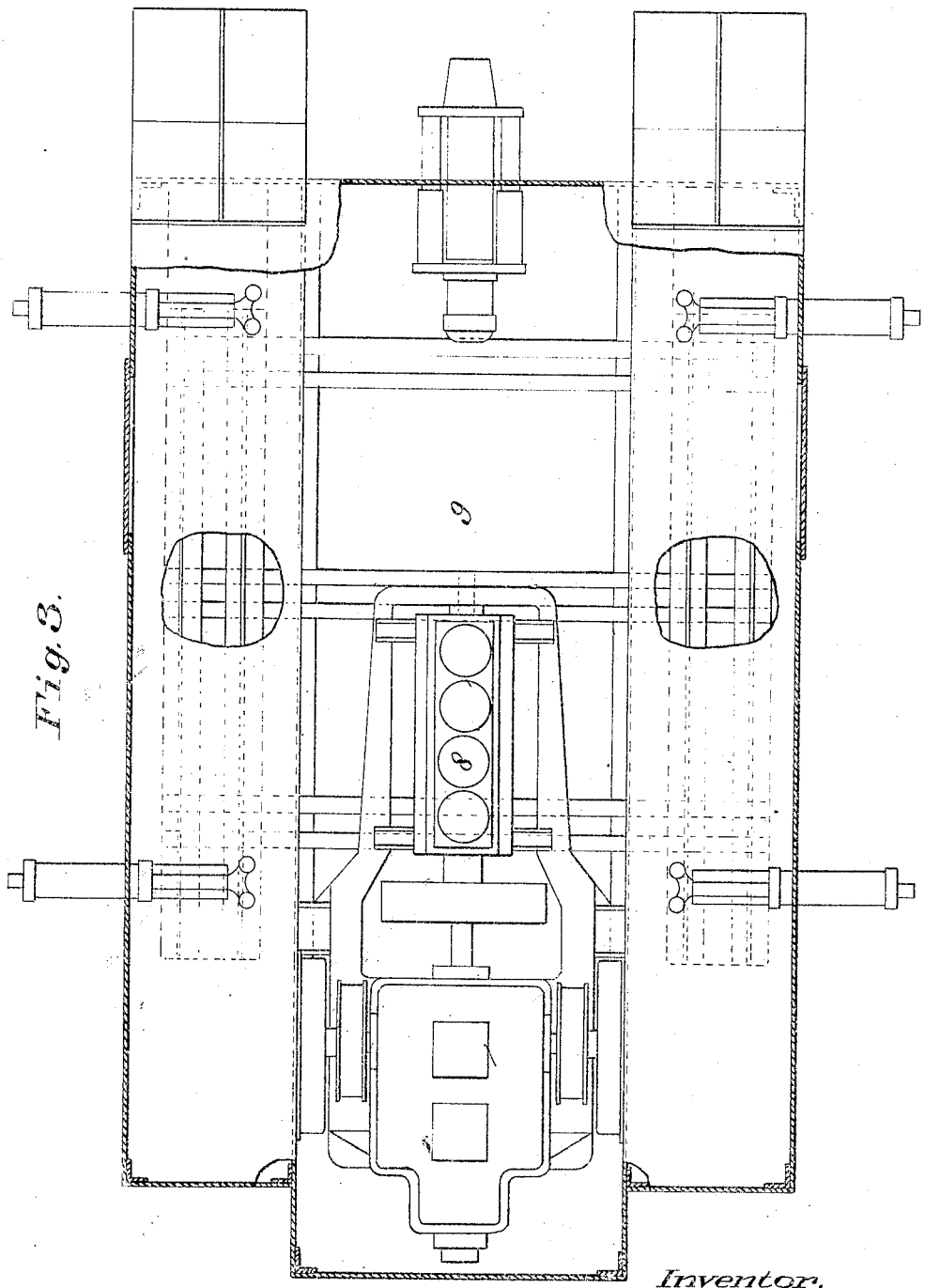

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

ARMORED TRACTOR.

1,365,402.     Specification of Letters Patent.     Patented Jan. 11, 1921.

Application filed May 20, 1918. Serial No. 235,643.

*To all whom it may concern:*

Be it known that I, PLINY E. HOLT, a citizen of the United States, residing at Stockton, in the county of San Joaquin and State of California, have invented new and useful Improvements in Armored Tractors, of which the following is a specification.

This invention relates to traction engines of the self-laying track variety, and pertains especially to an armored tractor suitable for military purposes.

Having reference to the accompanying drawings—

Figure 1 is a side view of the tractor partly in section.

Fig. 2 is a plan detailed view of the truck.

Fig. 3 is a horizontal section showing the motor and transmission housing in elevation.

Figure 4:
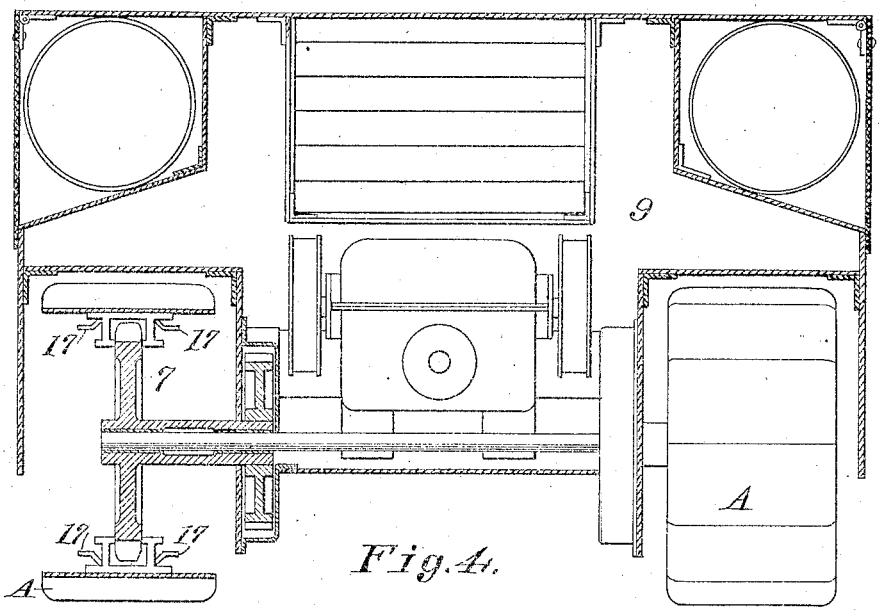
Figs. 4 and 5 are vertical cross sections.

A—A represent a pair of endless, self-laying chain tracks on which the vehicle travels and is supported, and through which tracks the engine is driven and steered by mechanism not necessary here to be shown; the means for supporting the weight of the vehicle on the tracks and maintaining the position of the tracks constituting the chief features of the present invention.

In view of the great length of these machines, these tracks are quite long. Therefore, it becomes necessary to support the machine through the greater portion of its length. To that end I employ a roller truck traveling on the ground run of the track and a roller truck composed of three hinged sections 2—3—4; the front section 4 carrying the front idler 5 and each section having its own set of load-supporting springs 6.

The track belt A passes around the front idler 5 and the rear drive sprocket 7, being operated through suitable drive connections from the motor 8 which is mounted in the armored casing 9. Each adjacent pair of truck sections 2—3 and 3—4 is hingedly connected by a rod 10; these rods extending across beneath the main frame and connecting the opposite trucks.

Figure 5:
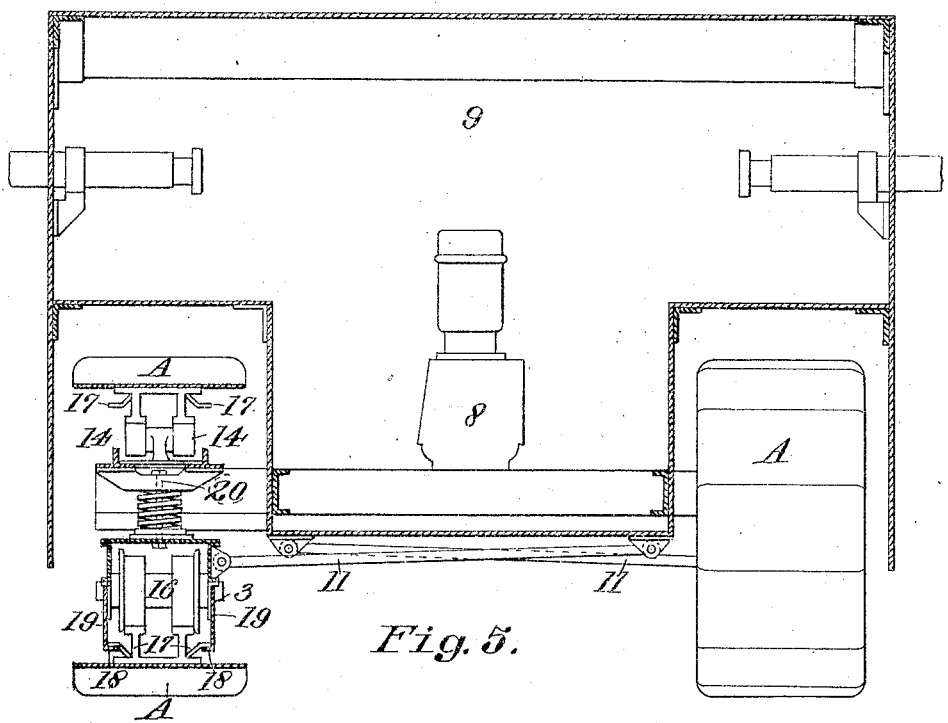

In addition to the bracing afforded the trucks by the hinged rods 10, I provide the radius rods or reins 11, which, as shown in Fig. 5, are pivoted at one side of the main frame across to the opposite truck. These reins allow for the free vertical movement of the truck sections in the ordinary travel of the machine over the ground. The upper run of the track is supported on the rollers 14. In order to prevent the track from dropping away from the truck rollers 16, each track link is provided with outriggers 17, or equivalent devices, engaging the inwardly turned flanges 18 of the cheek plates 19 on the truck sections. Some such means to keep the track up against the truck rollers is essential in machines of this sort where there is an extended stretch of track underneath the trucks, particularly where the vehicle has to bridge depressions in the terrain.

The trucks are prevented from dropping away from the main frame by means of bolts 20 which are anchored to the top of the truck frames and are headed at their upper ends and adapted to have a loose sliding fit on suitable guides on the main frame, so that while the bolts will not interfere with the spring motion of the trucks, with respect to the main frame, they limit the drop of the truck sections below the main frame.

By the foregoing construction the trucks and tracks provide all necessary amplitude of movement and yet their operative relation is always properly maintained.

Having thus described my invention, what I claim and desire to secure by Letters Patent is—

1. An armored tractor, comprising a main armored supporting frame, a pair of self-laying chain tracks at each side of the frame and supporting the same, a roller truck consisting of a plurality of articulated sections greater than two within each track, spring supports between each track section and the main frame, a main driving sprocket for each track mounted on the main frame, a front idler mounted on the forward end of the foremost truck section to guide the forward end of the track, and means by which the truck sections are prevented from dropping away from the main frame and the track prevented from dropping away from the truck rollers, when the vehicle is bridging a depression.

2. In a vehicle, the combination of a main frame, a self-laying chain track at each side of the frame, spring trucks within the track on which the frame is supported, means by which the track is prevented from dropping away from the trucks, and also means by which the trucks are prevented from dropping away from the frame.

3. In a vehicle, the combination of a main frame, a self-laying chain track at each side of the frame, spring trucks within the track on which the frame is supported, means by which the track is prevented from dropping away from the trucks, and also means by which the trucks are prevented from dropping away from the frame, the trucks each composed of a plurality of sections, the sections being hinged together on a pivot shaft which extends across beneath the machine.

4. In a vehicle, a self-laying track mechanism including driving and idler sprocket wheels, a chain track carried by said wheels, an extended truck frame within each track, load supporting rollers journaled on the truck frame for operation upon the ground stretch of the track, and side plates on the truck frame inclosing the rollers and formed with means at their lower edges to engage and support the track whereby to prevent the latter from dropping away from the rollers.

In testimony whereof I have hereunto set my hand in the presence of two subscribing witnesses.

PLINY E. HOLT

Witnesses:
JOHN H. HERRING,
W. W. HEALEY.